(12) United States Patent
Rice et al.

(10) Patent No.: US 6,686,077 B2
(45) Date of Patent: Feb. 3, 2004

(54) LIQUID HETERO-INTERFACE FUEL CELL DEVICE

(75) Inventors: Robert R. Rice, Simi Valley, CA (US); Jan Vetrovec, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 163 days.

(21) Appl. No.: 09/989,540

(22) Filed: Nov. 21, 2001

(65) Prior Publication Data

US 2003/0096150 A1 May 22, 2003

(51) Int. Cl.[7] .................. H01M 8/00; H01M 4/86
(52) U.S. Cl. ................. 429/12; 429/13; 429/40
(58) Field of Search .................. 429/12, 40–44, 429/101, 105, 13

(56) References Cited

U.S. PATENT DOCUMENTS

| | | | |
|---|---|---|---|
| 5,607,784 A | * | 3/1997 | Jalan et al. ............ 429/16 |
| 5,846,669 A | * | 12/1998 | Smotkin et al. ......... 429/41 |
| 6,146,780 A | * | 11/2000 | Cisar et al. ............ 429/34 |

FOREIGN PATENT DOCUMENTS

| EP | 45609 | * | 2/1982 | .......... H01M/10/36 |
|---|---|---|---|---|

OTHER PUBLICATIONS

Baker, B.S., ed., *Hydrocarbon Fuel Cell Technology*, Academic Press, New York, NY 1965.

Espenson, J.H. et al., *Bromide Ions And Methyltrioxorhenium As Cocatalysts For Hydrogen Peroxide Oxidations And Brominations*, J. Org., Chem. 1999, 54, 1191–1196.

Gould, R.F., ed., *Fuel Cell Systems*, American Chemical Society, Washington, D.C., 1965.

Herrman, W.A. et al., Angew. Chem., Intl. Ed. Engl., 1991, 30, 1638–1641.

Taitelbaum, I..Z. Elektrochem. 16, 295 (1910).

* cited by examiner

*Primary Examiner*—Stephen Kalafut
(74) *Attorney, Agent, or Firm*—Shimokaja I Fritz LLP

(57) ABSTRACT

A fuel cell device for generation of electricity from a polar oxidizer liquid and a non-polar fuel fluid includes a cathode in contact with the polar oxidizer liquid; an anode in contact with the non-polar fuel fluid; and a separator for separating the polar oxidizer liquid from the non-polar fuel fluid. The separator is made from material that is lyophobic with respect to the oxidizer liquid, and has a plurality of apertures, which are appropriately sized and spaced to form a meniscus in each aperture. The meniscus forms a liquid heterointerface between the conductive polar oxidizer liquid and the non-polar fuel fluid providing a controlled contact surface for oxidation processes. The fuel side of the separator may be coated with a conductive material to form the anode, in electric contact with the perimeter of the meniscus, and the cathode may be formed on the oxidizer side of the separator.

32 Claims, 7 Drawing Sheets

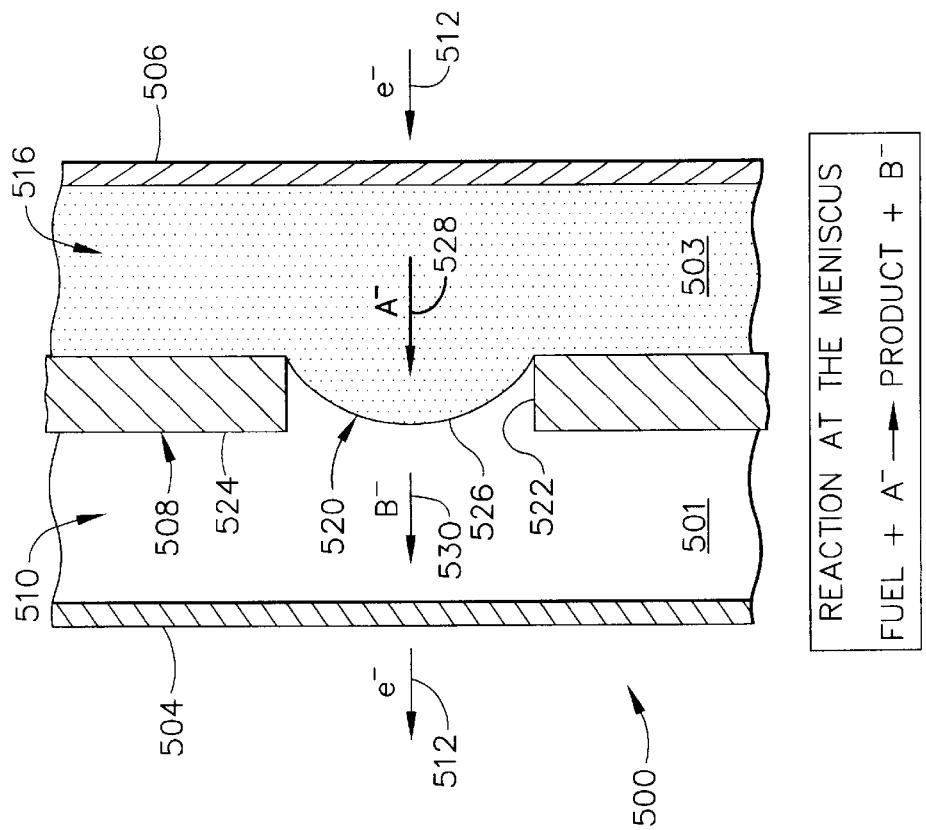
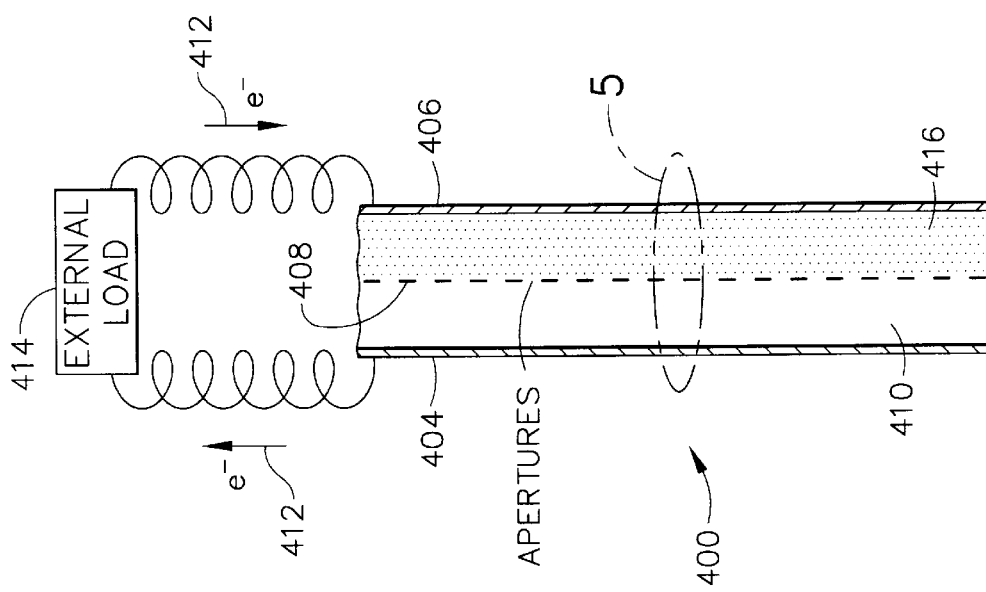
FIG. 5
FIG. 4

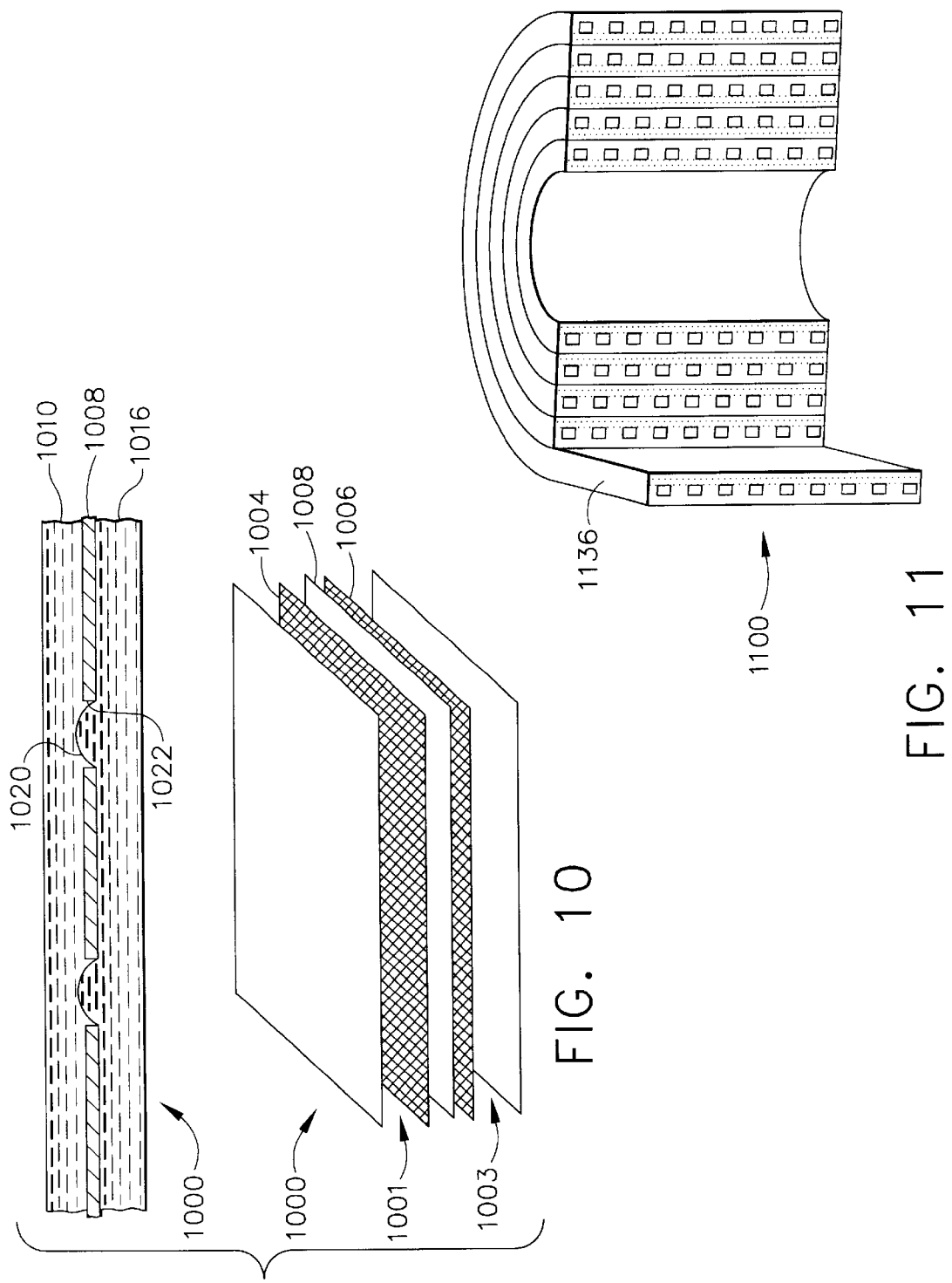

LIQUID HETERO-INTERFACE FUEL CELL DEVICE

BACKGROUND OF THE INVENTION

The present invention generally relates to fuel cells for generation of electricity and, more particularly, to a liquid hetero-interface fuel cell device.

As the worldwide energy shortage worsens, fuel cells have become attractive because of their high efficiency, low emission characteristics and exceptional reliability. Conventional methods of converting chemical energy of hydrocarbon fuels into electricity involve combustion. Such methods may use various types of steam turbines or internal combustion engines whose thermodynamic efficiency is limited to about 40%, with 25% being an average efficiency. Galvanic cells provide an alternate approach to converting chemical energy into electricity.

A galvanic cell which can oxidize hydrogen or hydrocarbon fuel is known as a fuel cell. Not limited by the Carnot or Stirling cycle efficiencies, a fuel cell can achieve a thermodynamic efficiency over 50% and possibly even higher than 80%. Economically viable fuel cells would find applications ranging from propulsion of automobiles, trains, and aircraft to generation of electricity in utility power stations, industrial plants, or private homes. Wide deployment of fuel cells would permit doubling or tripling the extractable energy from existing fossil fuel resources, thereby alleviating the energy shortage. Unlike conventional combustion, fuel cells do not pollute the environment and reduce contributions to the "green house effect." Of the numerous fuel cell concepts investigated in the last 90 years with varying degree of success, however, relatively few were advanced into commercial products.

Probably the most successful fuel cell developed in a variety of forms uses gaseous hydrogen fuel and oxygen oxidizer. Some of these devices were developed into commercial products for use in space, or in remote applications such as marine buoys. Beyond these niche, high-value applications, however, fuel cells have not won wide acceptance. Reasons for this situation include low availability and poor storability of certain easy-to-use fuels (as is the case with hydrogen), difficulty in achieving complete oxidation of more complex hydrocarbon molecules, poor electric conductivity of commonly available petroleum-based fuels, and high cost of electrodes due to the use of rare elements or noble metals. One of the problems is that the membrane separating the fuel and the oxidizer must allow the chemical species to be physically transported across the membrane while the electrons associated with the oxidation-reduction reaction are collected and separately flow through the external load. A voltage is maintained across the membrane by the chemical potential gradients of the reacting species, which serve to separate electrical charge. Carbon compounds and intermediates do not readily cross the conventional membranes and so reaction stops. $CO_2$ is also a gaseous compound and must be removed in some way. These problems are sufficiently serious that, in current hydrocarbon fuel cells, the hydrogen is simply stripped away in the reforming process and the energy associated with carbon oxidation rejected as waste heat. Besides being bulky, heavy, and hazardous to operate, reformers add complexity and reduce efficiency of the fuel cell system as the energy in the fuel attributable to its carbon content is largely wasted in most such designs.

Fuel cell designers must also overcome numerous challenges which restrict operating characteristics of the cell such as removal of reaction products (typically carbon dioxide and/or water), lifetime of electrodes, and poisoning of electrolyte by parasitic reactions. The ideal fuel cell would use widely available, easily storable, low cost fuels (e.g., kerosene, alcohol, natural gas) and atmospheric oxygen. Construction and operation of the cell should allow it to compete against established electric power generating technologies in specific market segments. Some of the considerations in designing a fuel cell are reactivity, invariance, oxidizers, catalysts, cell separators, and polar and non-polar fluids.

Reactivity relates to both the speed and completeness of the reaction. Reaction speed requires high electrode activity, which is controlled by the rates and mechanisms of electrode reactions, and results in high current densities. Reaction completeness requires proper stoichiometry. For example, carbon should always be oxidized to $CO_2$ rather than CO so that a maximal amount of electrical energy is released in the reaction. In prior art, the reactivity requirement has been met by using porous materials to enlarge the active area of electrodes, by increasing pressure, by raising temperature, or by using catalysts.

Invariance relates to the objective that a fuel cell, unlike a conventional battery, should maintain constant performance throughout its life. This implies that there should be no corrosion or side reactions, and no changes in the electrolyte or the electrodes. In particular, fuel should not diffuse over and mix with the oxidizer. Catalysts can become poisoned and the pores of gas electrodes can become clogged with liquid ("drowning"), gas ("blowing"), or extraneous material making the electrode inoperative. If "wrong" ions carry the current, the electrolyte may lose its invariance, and the cathode and anode reactions may be thrown out of balance.

Oxidizers relate to the fact that most fuel cells use oxygen for fuel oxidation. Oxygen is first cathodically reduced to $OH^-$ cations, which react in the electrolyte with anions originating from fuel. Unfortunately, reactivity of $OH^-$ with many fuels is very slow, which leads to impractically low current densities. While catalysts can often remedy this situation, they typically require use of expensive materials such as platinum or palladium, hence driving up the capital cost of the fuel cell system. Reactivity can be also increased by choosing a more reactive oxidizer such as the $O_2H^-$ cation.

Catalysts previously used with fuel cells are typically in the form of coatings on electrode surfaces. Recently, a new soluble catalyst has been introduced, which is suitable for increasing reactivity of $H_2O_2$ in oxidizing a broad variety of organic substances. This soluble catalyst is methyltrioxorhenium ($CH_3ReO_3$), also known as methylrhenium trioxide or MTO. Synthesis of MTO was first reported in 1979 and its use as a catalyst for hydrogen peroxide oxidation of a number of alkenes, alkynes, and ketones was first published in 1991 by W. A. Hermann et al. in the journal Angew. Chem., Intl. Ed. Eng., vol. 30, pp. 1638–41. This catalyst has important attractive features including ease of synthesis, stability in the air, stability and solubility in aqueous (low pH) as well as organic solvents, low toxicity, and effectiveness as either a homogeneous or heterogeneous catalyst. Unlike other catalysts, MTO alone does not decompose $H_2O_2$. Research shows that addition of a cocatalyst (preferably bromine ions) can further accelerate processes catalyzed by MTO as published in 1999 in the article "Bromide ions and methyltrioxorhenium as co-catalysts for hydrogen peroxide oxidations and brominations," by J. H. Espenson et al. in the JournalOrg. Chem., vol. 54, pp. 1191–96.

Cell separators relate to the fact that it is impractical to mix large volumes of fuel and oxidizer. In most fuel cells, fuel and oxidizer are maintained in different compartments of the cell sharing a common wall known as a separator. Such a separator is permeable so that the fuel or the oxidizer can be contacted and reacted in a controlled fashion. Oxidation of the fuel takes place on the surface or within the separator. To promote high reaction rates, fuel cell separators often contain catalysts. A variety of separator designs have been used with varying degrees of success, including porous beds and ion exchange membranes. Key issues in design of fuel cell separators include maintaining high transport rates for reacting species and reaction products, and low susceptibility to flooding.

Polar and non-polar fluids relate to the well known fact that oil and vinegar do not mix. This is because the molecules of oil are non-polar, i.e., they have no net electrical dipole moment (product of charge times separation), whereas the molecules in the aqueous solution of acetic acid (vinegar) do have a net dipole moment. The result is that polar molecules attract each other strongly and tend to exclude non-polar molecules, thus forming separate regions separated by a boundary called a meniscus. There is surface free energy associated with the boundary that is manifested as surface tension. On an atomic scale, the boundary is indistinct with a gradual transition of composition from polar to non-polar molecules over a very short distance. The concentration gradients can be described as chemical potential gradients in a way analogous to electrical potential gradients. This heterointerface between polar and non-polar liquids is very similar in many respects to the P—N homojunctions and heterojunctions familiar from the field of semiconductor devices, where holes and electrons are the species maintained in separate regions of a continuous solid.

The first galvanic cell converting hydrocarbon fuels such as petroleum, stearic acid, and starch into electricity was demonstrated in 1910 by I. Taitelsbaum published in Z. Elektrochem., vol. 16, p. 295. Cells working with a number of other gas or liquid hydrocarbon fuels were successfully demonstrated in the following years, most notably after the second world war. One attractive feature of a fuel cell is its simplicity. For example, a fuel cell can be as simple as two electrodes immersed into an electrolyte containing a mixture of alcohol and potassium hydroxide. A conventional configuration of a fuel cell 100 is shown in FIG. 1. As seen in FIG. 1, fuel cell 100 includes a container 102, porous electrodes comprising an anode 104 and cathode 106, and electrolyte 108. Fuel gas 110 enters container 102, diffuses through anode 104, and is oxidized, releasing electrons 112 to an external circuit connected to load 114, where useful work may be performed. Oxidizer 116 enters container 102, diffuses through cathode 106, and is reduced by electrons 112 that have come from anode 104 by way of external circuit connected to load 114. Oxidation products 118 may be produced and expelled as waste. Fuel cell 100 may also produce waste heat.

The literature is replete with material relating to numerous aspects of fuel cell technology, for example, see "Fuel Cell Systems" by R. F. Gould, ed., published in 1965 by the American Chemical Society, Washington, D.C. Probably the most successful fuel cell developed in a variety of forms uses gaseous hydrogen fuel and oxygen oxidizer. An example of one of these devices, known as $H_2$—O2 fuel cells, is illustrated diagrammatically in FIG. 2. FIG. 2 shows fuel cell 200 including container 202 forming gas cavities 201 and 203, porous electrodes comprising anode 204 and cathode 206, and membrane 208. Hydrogen 210 enters container 202 into gas cavity 201, diffuses through anode 204, and is oxidized in the reaction:

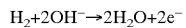

releasing electrons to an external circuit (not shown in FIG. 2) which may be connected to a load, where useful work may be performed. Oxygen 216 enters container 202 into gas cavity 203, diffuses through cathode 206, and is reduced in the reaction:

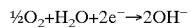

by electrons that have come from anode 204 by way of the external circuit which may be connected to a load. The overall reaction is

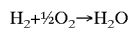

so that water is produced and which may be expelled as waste oxidation products and inerts 218 from fuel cell 200.

Some $H_2$—$O_2$ fuel cell devices were developed into commercial products for use in space, or in remote applications such as marine buoys. However, due to the low availability and poor storability of hydrogen, $H_2$—$O_2$ fuel cells have not won a wide acceptance beyond these niche, high-value applications.

Difficulty in achieving complete oxidation of more complex hydrocarbon molecules and poisoning of cathode electrolyte by $CO_2$ has thus far prevented successful development of an efficient fuel cell working directly with hydrocarbon fuels. See, for example, "Hydrocarbon Fuel Cell Technology" by B. S. Baker, ed., published in 1965 by Academic Press, New York, N.Y. Owing to their poor conductivity, nonpolar hydrocarbon fuels have been particularly difficult to work with. Consequently, industrial or electrical utility applications are usually based on reforming natural gas or another hydrocarbon to produce hydrogen that is used in the cell to actually produce electricity. FIG. 3 shows several approaches to the reformer-fuel cell architecture developed in the prior art. FIG. 3 represents processes normally used in conjunction with fuel cells 100 and 200 in a more abstract graphical form for the sake of simplicity. For comparison, a direct oxidation process 310 is shown near the top of FIG. 3. The direct oxidation process 310 comprises processes of hydrocarbon fuel 301 diffusing through anode 302, and being oxidized, where $CO_2$ may be expelled as waste oxidation product 305, releasing electrons to an external circuit (not shown) connected to a load where useful work may be performed. Oxidizer comprising air 303 diffuses through cathode 304, where oxygen is separated from nitrogen 307, nitrogen 307 is expelled as waste, and oxygen in air 303 is reduced by electrons that have come from anode 302 by way of the external circuit. The overall reaction producing electricity is facilitated by electrolyte 306. This process is most desirable as it allows direct oxidation of hydrocarbon fuel without a need for external reforming process and promises highest energy extraction from the fuel. However, in prior art, this process has been very difficult to implement, thereby proving a motivation for development of reforming processes described below.

Continuing with FIG. 3, external reformer process 320 may be similar to direct oxidation process 310, but further comprises processes of reforming the hydrocarbon fuel in a reformer 328 and purifying the reformed fuel in a purifier 329, as known in the art, before diffusing the fuel, now in the form of hydrogen 321 into anode 322. Also as seen in FIG. 3, internal reformer process 330 may be similar to external reformer process 320, but the reformer, purifier, and anode have been combined into a single unit 338, as known in the art, to achieve certain gains in efficiency. Finally, as seen in FIG. 3, partial oxidation molten carbonate process 340 comprises a process of partially oxidizing the hydrocarbon fuel in partial oxidizer 348 before diffusing the fuel into anode 342. Chemical reactions producing electricity are facilitated by molten carbonate 346, as known in the art. Carbon dioxide is usually a waste product in the reforming process and typically the heat of formation for the $CO_2$ is rejected as waste heat and does not produce electric power in an external circuit.

As can be seen, there is a need for a fuel cell that uses widely available, easily storable, low cost fuels such as kerosene, alcohol, and natural gas and that uses atmospheric oxygen as oxidizer. There is also a need for a fuel cell the construction and operation of which allows it to compete against established electric power generating technologies in specific market segments. Furthermore, there is a need for a fuel cell which exhibits efficient removal of reaction products such as carbon dioxide and water, long and stable lifetime of electrodes, and reduced poisoning of electrolyte by parasitic reactions.

SUMMARY OF THE INVENTION

The present invention provides a fuel cell that uses widely available, easily storable, low cost fuels such as kerosene, alcohol, and natural gas and that uses atmospheric oxygen as oxidizer. The present invention also provides a fuel cell the construction and operation of which may allow it to compete against established electric power generating technologies in specific market segments. The present invention further provides a fuel cell which exhibits efficient removal of reaction products such as carbon dioxide and water, long and stable lifetime of electrodes, and reduced poisoning of electrolyte by parasitic reactions.

In one aspect of the present invention, a fuel cell device for generation of electricity from a polar oxidizer liquid and a non-polar fuel fluid includes a separator for separating the polar oxidizer liquid from the non-polar fuel fluid. The separator is made from a material that is hydrophobic with respect to the polar oxidizer liquid, and has a large number of small apertures, which are appropriately sized and spaced to provide a direct, controlled contact between the polar oxidizer liquid and the non-polar fuel fluid.

In another aspect of the present invention, a fuel cell device for generation of electricity from a conductive polar oxidizer liquid and a non-polar fuel fluid includes a cathode in contact with the polar oxidizer liquid; an anode in contact with the non-polar fuel fluid; and a separator for separating the polar oxidizer liquid from the non-polar fuel fluid. The separator is made from a material that is hydrophobic with respect to the polar oxidizer liquid, and has a plurality of apertures, which are appropriately sized and spaced to form a meniscus in each aperture. The meniscus provides a controlled contact surface and forms a liquid heterointerface between the conductive polar oxidizer liquid and the non-polar fuel fluid in and about which liquid heterointerface oxidation processes occur.

In still another aspect of the present invention, a fuel cell device for generation of electricity from a conductive polar oxidizer liquid and a non-polar fuel fluid includes a cathode in contact with the polar oxidizer liquid; an anode in contact with the non-polar fuel fluid; and a separator for separating the polar oxidizer liquid from the non-polar fuel fluid. The separator is made from a material that is hydrophobic with respect to the polar oxidizer liquid, and has a plurality of apertures, which are appropriately sized and spaced to form a meniscus in each aperture. The meniscus provides a controlled contact surface and forms a liquid heterointerface between the conductive polar oxidizer liquid and the non-polar fuel fluid in and about which liquid heterointerface oxidation processes occur. The fuel side of the separator is coated with a conductive material to form the anode, the conductive material is in electric contact with the perimeter of the meniscus, and the cathode is formed on the oxidizer side of the separator.

In a further aspect of the present invention, a method for generation of electricity from a conductive polar oxidizer liquid and a non-polar fuel fluid includes steps of placing a cathode in contact with the polar oxidizer liquid; placing an anode in contact with the non-polar fuel fluid; and separating the polar oxidizer liquid from the non-polar fuel fluid, using a separator made from a material hydrophobic with respect to the polar oxidizer liquid. The separator has a number of apertures, which are appropriately sized and spaced to form a meniscus in each aperture. The meniscus forms a liquid heterointerface between the conductive polar oxidizer liquid and the non-polar fuel fluid in and about which liquid heterointerface oxidation processes occur.

These and other features, aspects and advantages of the present invention will become better understood with reference to the following drawings, description, and claims.

BRIEF DESCRIPTION OF THE DRAWINGS

FIG. 4 is a schematic diagram illustrating a general overview of a fuel cell according to one embodiment of the present invention;

FIG. 5 is an enlarged schematic diagram, corresponding to the region enclosed by oval 5 in FIG. 4, illustrating a detail view of a fuel cell according to one embodiment of the present invention;

FIG. 10 is a schematic diagram illustrating construction of a fuel cell according to an embodiment of the present invention;

FIG. 11 is a schematic diagram illustrating a cut-away view of an alternative construction of a fuel cell according to an embodiment of the present invention.

DETAILED DESCRIPTION OF THE INVENTION

Figure 1:
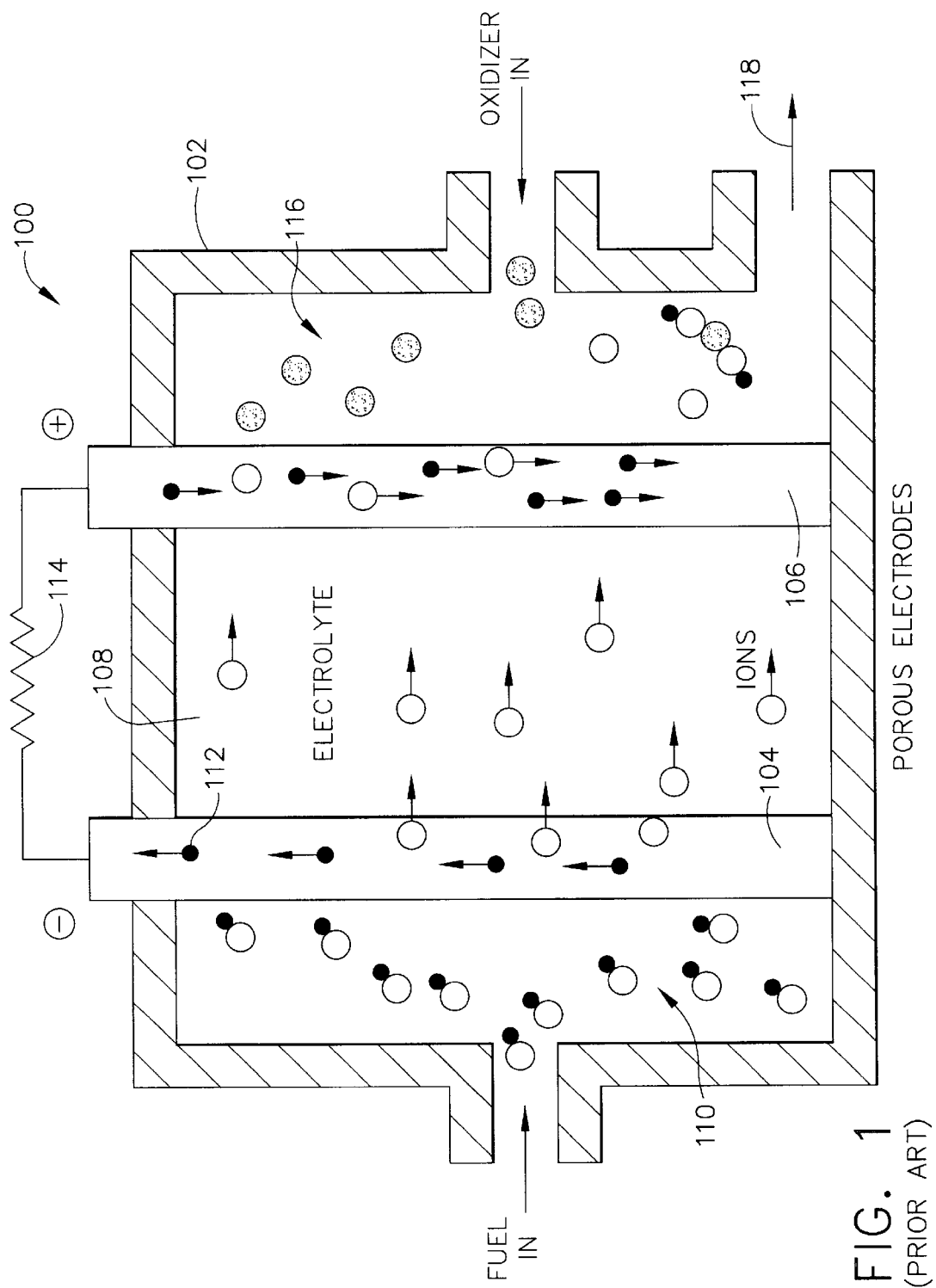
FIG. 1 is a schematic diagram of a fuel cell as generally known in the art.
Figure 2:
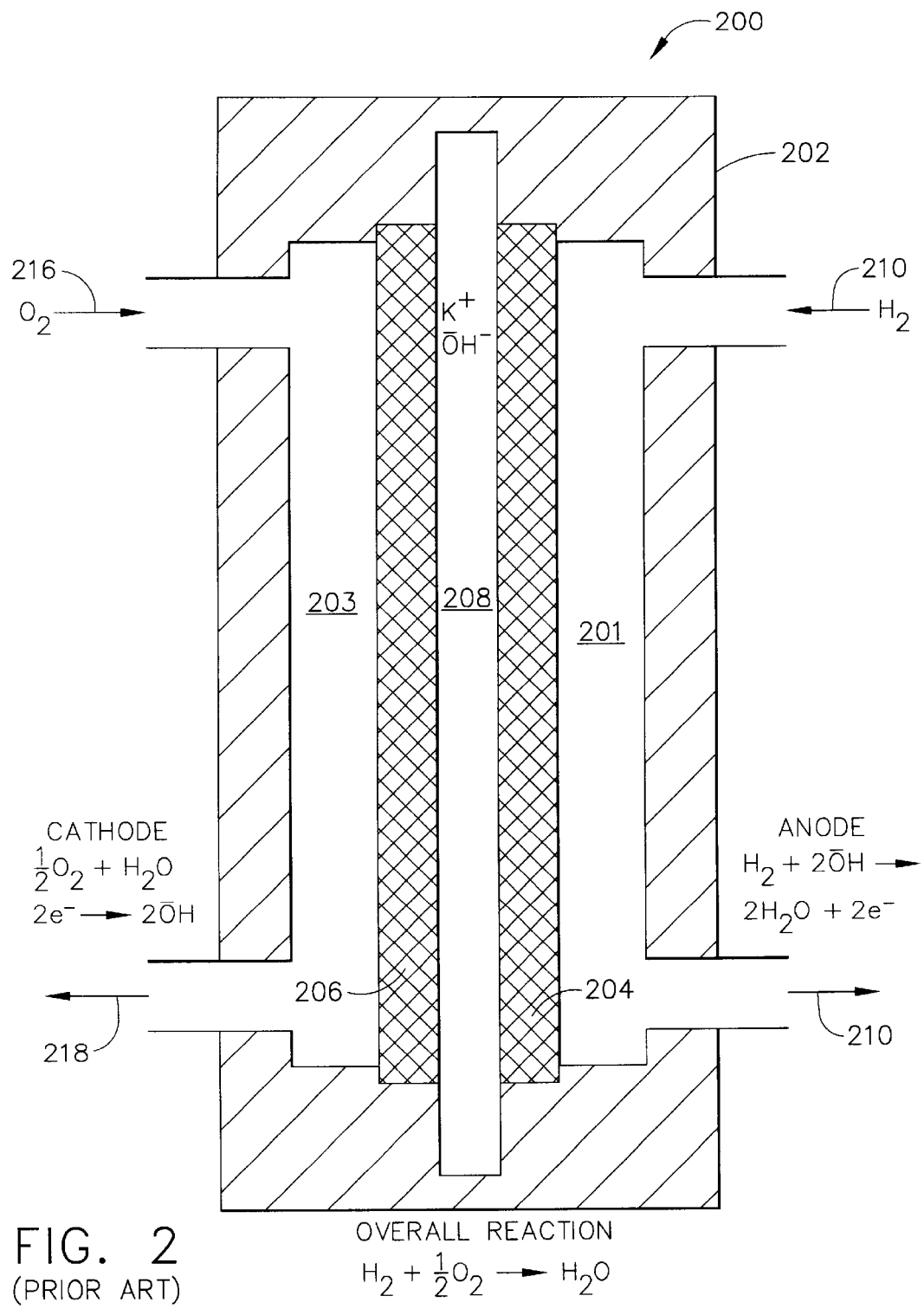
FIG. 2 is a schematic diagram of a hydrogen-oxygen fuel cell as generally known in the art.
Figure 3:
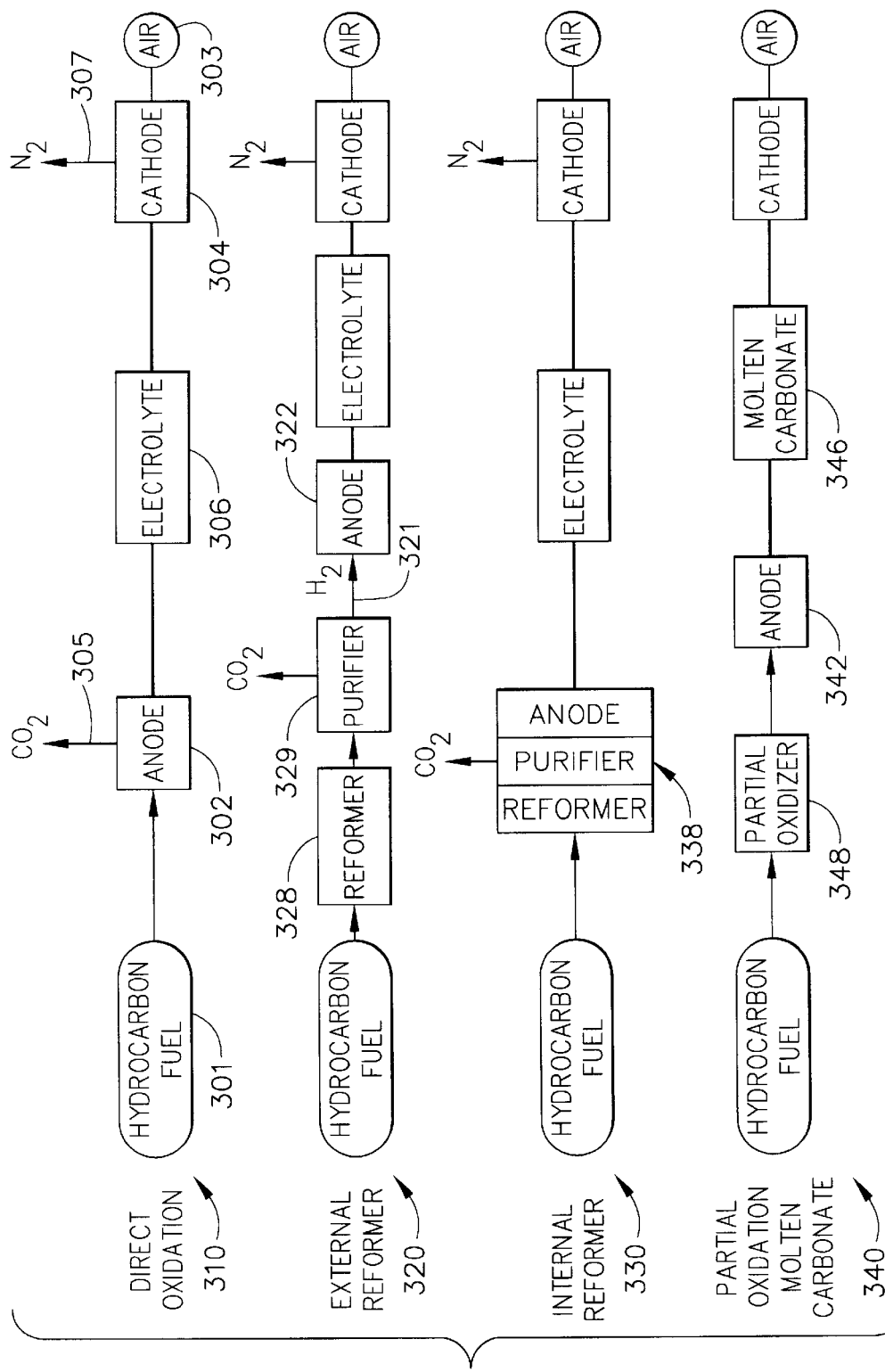
FIG. 3 is a schematic diagram of reformer-type fuel cell systems as generally known in the art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

There are many applications for the liquid heterointerface fuel cell for generation of electrical power, especially mobile power. For example, some classes of applications are exemplified by land vehicles including cars, trucks, and tanks; ships and boats including submarines; spacecraft and aircraft including APU replacement in commercial aircraft; emergency power for buildings including airports and auditoriums; and power for remote sites and disaster relief.

The present invention provides a fuel cell that uses widely available, easily storable, low cost fuels such as kerosene, alcohol, and natural gas and that uses atmospheric oxygen as oxidizer. The present invention also provides a fuel cell, the construction and operation of which, unlike prior art fuel cell devices, may allow it to compete against established electric power generating technologies in specific market segments. The present invention further provides, in contrast to the prior art, a fuel cell which exhibits more efficient removal of reaction products such as carbon dioxide and water, longer and more stable lifetime of electrodes, and reduced poisoning of electrolyte by parasitic reactions. Furthermore, the fuel cell of the present invention operates at convenient temperature and pressure, unlike many prior art fuel cells which operate at high temperatures, making it especially suitable for portable use and use in vehicles.

The fuel cell of the present invention may use a liquid heterointerface formed by a conductive polar oxidizer liquid (e.g., aqueous solution) in direct, controlled contact with a non-polar liquid fuel (e.g., kerosene). A separator which is used to maintain fuel and oxidant in their respective compartments of the cell may be made of material lyophobic with respect to the oxidizer or fuel and provided with a large number of small penetrations or perforations. In general, a material is lyophobic with respect to a liquid if it does not have an affinity for that liquid, or in other words, has a liquid (or solvent) avoiding nature with respect to that liquid. Thus, forces of surface tension in at least one of the liquid phases permit formation of a meniscus in each of the perforations. Such a meniscus is a controlled contact surface between the fuel and oxidant on which oxidation processes occur. The fuel side of the separator may be coated with conductive material which is in electric contact with the perimeter of the meniscus. Electrons are transferred around an external circuit including the load to be powered. Gaseous products of oxidation remain on the fuel side of the separator and are prevented from poisoning the oxidizer.

The fuel cell of the present invention allows efficient operation with common polar liquid hydrocarbon fuels with utilization of the energy released by complete oxidation of the fuel. Operating at convenient temperature and pressure, this invention can provide significant benefit for mobile fuel cell applications. The invention offers major advantages for a wide range of fuel cell applications, particularly those involving mobile platforms or protecting electrical power for high value functions. In one embodiment of the disclosed invention, a low cost throw-away cell could be used as a conventional battery replacement for many electronics applications.

The fuel cell of the present invention possesses a number of attributes and operating characteristics to meet significant needs, for example:

Operation with hydrocarbon fuels;

Complete oxidation of hydrocarbon fuels to carbon dioxide and water;

Separator made of lyophobic material for high resistance to flooding;

Separator apertures for facilitating contact between fuel and oxidizer;

Separator suitable for high feed rates of reacting species and fast removal of reaction products;

Well-defined reaction zone for fuel oxidation;

Peroxide oxidant for high reaction rates;

MTO catalyst for increased oxidation rates;

Low susceptibility to electrolyte poisoning by carbon dioxide;

Efficient reduction of oxygen to alkaline hydrogen peroxide;

Low ohmic losses;

Physically compact; and

Low cost operation.

The fuel cell of the present invention is suitable for operation with hydrocarbon fuels. In one embodiment of the present invention, a fuel cell device uses a perforated separator between the fuel and oxidizer compartments of the cell. The separator is made of lyophobic material, also referred to as hydrophobic material. The material is hydrophobic with respect to at least one of the reactants, either the fuel of the oxidizer. Hydrophobic materials include Teflon®, for example, poly-vinyl-chloride (PVC), and many common plastics. The separator is perforated by a plurality of small apertures. The separator may be formed, for example, from commercially available perforated plastic sheet. Size of the apertures is chosen so that one of the reactants forms a meniscus within each aperture. Oxidation of the fuel takes place on the meniscus surface. Cathode and anode may be formed as individual members immersed in their respective electrolytes or formed on the opposite faces of the separator. In one embodiment, the oxidizer is a polar fluid, preferably aqueous electrolyte. Such electrolyte may contain hydrogen peroxide species, possibly in alkaline solution. Soluble catalyst may be added into the oxidizer or the fuel to promote reactivity. In another embodiment, alkaline peroxide oxidizer is produced directly within the cell.

Referring now to FIG. 4, one embodiment exemplified by fuel cell 400 is illustrated. Fuel cell 400 includes two electrodes, anode 404 and cathode 406, and separator 408. The space between anode 404 and separator 408 is filled with electrolyte containing fuel 410 while the space between cathode 406 and separator 408 is filled with electrolyte containing oxidizer 416. Fuel 410 is oxidized, releasing electrons 412 to an external circuit connected to load 414, where useful work may be performed. Oxidizer 416 is reduced by electrons 412 that have come form anode 404 by way of the external circuit connected to load 414. Separator 408 may be made of dielectric material having lyophobic properties as described above. Separator 408 can be perforated by a plurality of small apertures that permit fuel 410 and oxidizer 416 to come into contact. Preferably, such apertures cover over 50% of the separator 408 surface. Preferably, oxidizer 416 electrolyte is chosen to be a polar fluid.

Referring now to FIG. 5, a magnified view of a portion FIG. 4 is shown with corresponding elements numbered similarly. For example, fuel cell 400, anode 404, cathode 406, and separator 408 are shown, respectively as fuel cell 500, anode 504, cathode 506, and separator 508 in FIG. 5. When oxidizer compartment 503 of fuel cell 500 is filled with a polar oxidizer electrolyte 516 while fuel compartment 501 is empty, oxidizer electrolyte 516 can form a meniscus 520 within each separator aperture 522 that oxidizer electrolyte 516 contacts. Meniscus 520, which is caused by surface tension, can, under hydrostatic pressure, "bulge" towards the fuel side 524 of separator 508. By choosing aperture 522 size to be substantially smaller than the capillary length of oxidizer liquid 516, meniscus 520 can be stable, and oxidizer electrolyte 516 will not flow across separator 508 into fuel compartment 501. The surface tension forces involved can be very strong in small apertures, and hence can firmly hold meniscus 520 in place similar to the way a liquid film is held on a wet screen or a soap bubble is formed on a hoop. When, subsequently, fuel compartment 501 of fuel cell 500 is filled with fuel electrolyte 510, fuel electrolyte 510 can come into contact with meniscus 520 and a heterointerface 526 between the two fluids can be formed on the surface of meniscus 520. Such a heterointerface 526 is a permeable boundary highly suitable for contacting and reacting fuel and oxidizer. Preferably, oxidizer electrolyte 516 and cathode 506 materials are chosen so that negative ion species containing oxygen, of which there may be one or more, comprising anions A$^-$ 528, are formed within oxidizer electrolyte 516. Anion A$^-$ 528 can be transported to meniscus 520 where it may react with fuel electrolyte 510. The reaction zone is thus defined by meniscus heterointerface 526. The reaction may generate ionic as well as non-ionic species and free electrons in a variety of possible combinations. In a general way, the reaction may be described as

$$\text{Fuel} + A^- \rightarrow \text{Product} + B^- \quad (1)$$

where B$^-$ represents one or more charge carrying species, shown in FIG. 5 as B$^-$ 530. When external load, such as load 414 seen in FIG. 4, is applied to electrodes 504 and 506, electric charges can be continuously transported from cathode 506 through oxidizer electrolyte 516 into the reaction zone in vicinity of meniscus 520. From there they can be transported through the fuel electrolyte 510 into anode 504 and, in form of electrons 512 pass through the external load back to cathode 506, thus closing the circuit. It should be noted that charge in either fuel electrolyte 510 or oxidizer electrolyte 516 (or both) may also be transported by positive ions (cations).

Figure 6:
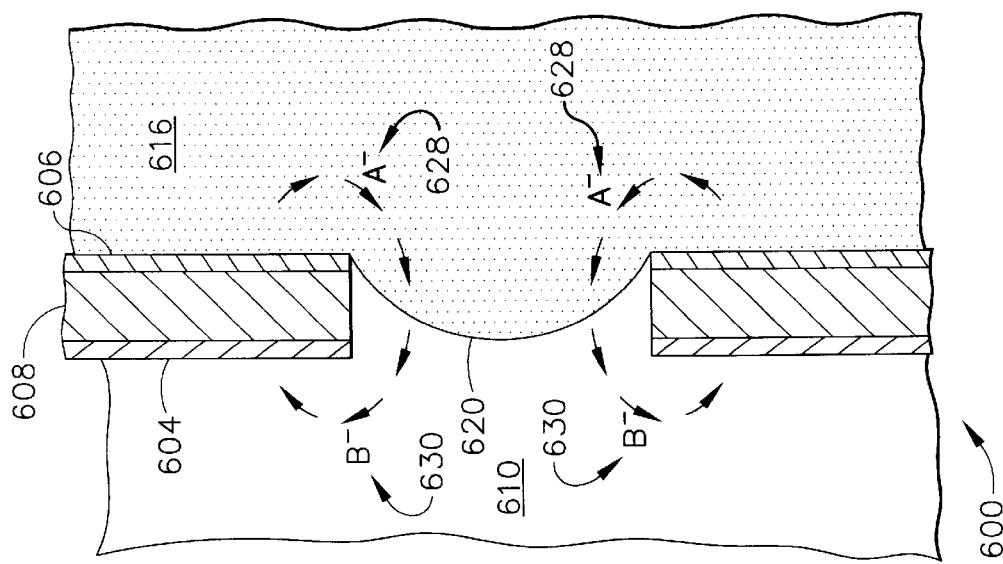
FIG. 6 is an enlarged schematic diagram, similar to that of FIG. 5, illustrating a detail view of a fuel cell according to an embodiment of the present invention.

FIG. 6 shows an embodiment, fuel cell 600, with an alternate arrangement of the electrodes where anode 604 and cathode 606 are formed on the opposite sides of separator 608. This arrangement may be conducive to inexpensive fabrication and compact packaging of the fuel cell. As with fuel cell 500 seen in FIG. 5, when external load, such as load 414 seen in FIG. 4, is applied to electrodes 604 and 606 of fuel cell 600 shown in FIG. 6, electric charges, carried by species A$^-$ 628 and B$^-$ 630, can be continuously transported from cathode 606 through oxidizer electrolyte 616 into the reaction zone in vicinity of meniscus 620. From there they can be transported through the fuel electrolyte 610 into anode 604 and, in form of electrons (not shown in FIG. 6) pass through the external load back to cathode 606, thus closing the circuit. It should be noted that charge in either fuel electrolyte 610 or oxidizer electrolyte 616 (or both) may also be transported by positive ions (cations).

While the present invention may be practiced with a variety of fuel and oxidizer combinations, one embodiment of the present invention uses oxidizer electrolytes containing OH$^-$ anions. Candidate oxidizer electrolytes in this case include various aqueous solutions containing alkali metal hydroxides, particularly NaOH and KOH, which have been successfully used with fuel cells of prior art. Preferably, a hydrocarbon fuel C$_n$H$_m$O$_p$ is completely oxidized so that the product contains only carbon dioxide and water according to an overall reaction

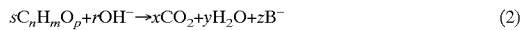

$$sC_nH_mO_p + rOH^- \rightarrow xCO_2 + yH_2O + zB^- \quad (2)$$

where the quantities s, r, x, y, and z are defined by reaction stochiometry. Anion CO$_3^{2-}$ is often present and carries its charge to the anode, where it may evolve as CO$_2$ gas.

Figure 7:
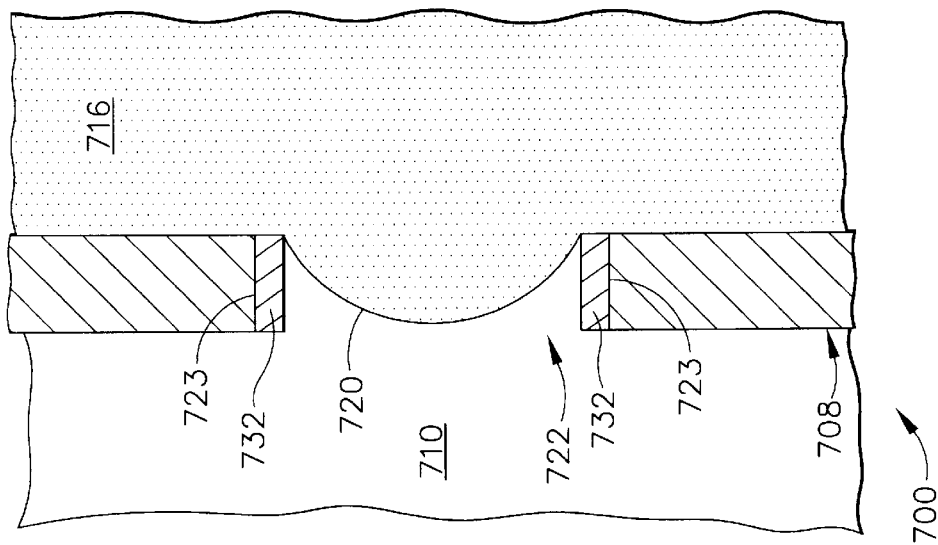
FIG. 7 is an enlarged schematic diagram, similar to that of FIG. 5, illustrating a detail view of a fuel cell according to an embodiment of the present invention.

Experience shows that the reactivity of the OH$^-$ anion is rather slow. To achieve current densities suitable for compact packaging of the fuel cell, it is often necessary to increase reaction rates of the oxidation process. One known approach is to provide a suitable catalyst in the reaction zone. FIG. 7 shows an embodiment, exemplified by fuel cell 700, with solid catalyst 732 applied to walls 723 of aperture 722. Fuel cell 700 also comprises separator 708, fuel electrolyte 710, oxidizer electrolyte 716, and meniscus 720, which function to produce electricity as similarly numbered elements described above. The presence of catalyst 732 may speed up the reaction rates and increase current density. Solid catalyst 732 may also be applied to other suitable areas in the vicinity of meniscus 720.

Another alternate approach that may be practiced with the present invention is to use a suitable catalyst dissolved in oxidizer electrolyte 716 or fuel electrolyte 710. Yet another approach to increasing the oxidation rate is to use more reactive oxidizer ions such as O$_2$H$^-$, Cl$^-$, or Br$^-$. A suitable oxidizer electrolyte containing O$_2$H$^-$ can be formed, for example, by addition of hydrogen peroxide (H$_2$O$_2$) into aqueous solution of a suitable alkali metal hydroxide. The invention may also be practiced with oxidizer electrolyte formed by a non-alkaline aqueous solution of H$_2$O$_2$. Oxidizing power of H$_2$O$_2$ can be further enhanced by addition of suitable catalyst such as the above mentioned methyltrioxorhenium (CH$_3$ReO$_3$), also known as methylrhenium trioxide or MTO. Further enhancements to reactivity of H$_2$O$_2$—MTO solution include addition of Br$^-$ ions.

A persistent problem with the operation of hydrocarbon fuel cells is effective removal of CO$_2$. In typical prior art fuel cells, the oxidation takes place in alkaline electrolyte, which makes the process susceptible to formation of carbonates that eventually poison the electrolyte. When the present invention is practiced with non-alkaline oxidizer electrolyte, such as the already mentioned solution of H$_2$O$_2$, such carbonates are not formed. In one embodiment, gaseous CO$_2$ is readily formed within or in near proximity to the separator apertures, and resulting gas bubbles are swept from the fuel cell by electrolyte flow. Alternately, in another embodiment, the fuel cell may be operated at high pressure to force CO$_2$ gas into solution. If desirable, electrolyte with dissolved CO$_2$ gas can be de-gassed by removing the electrolyte with dissolved CO$_2$ gas from the fuel cell and exposing the electrolyte to lower pressure or higher temperature, or both.

Figure 8:
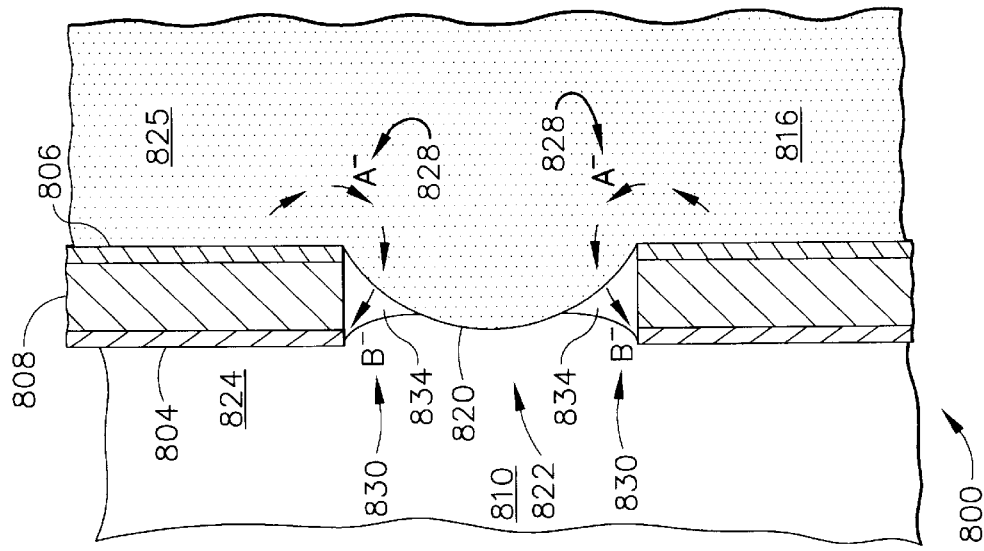
FIG. 8 is an enlarged schematic diagram, similar to that of FIG. 5, illustrating a detail view of a fuel cell according to an embodiment of the present invention.

The fuel cell of the present invention is not limited to use with liquid fuels, and may, in fact, be operated with fuels provided in the form of gas, vapor, or mist. FIG. 8 shows an alternative embodiment, exemplified by fuel cell 800, comprising anode 804, cathode 806, separator 808, oxidizer electrolyte 816 and meniscus 820, which function as similarly numbered elements described above. Separator 808 is referred to as having a fuel side 824 and an oxidizer side 825, comprising regions on opposite sides of separator 808 as shown in FIG. 8, for the purpose of establishing a directional orientation with respect to separator 808. Thus, fuel side 824 of separator 808 is exposed to fuel 810 provided in the form of gas, vapor, or mist. The reaction between fuel 810 and the oxidizer in oxidizer electrolyte 816, which takes place on the surface of meniscus 820, generates liquid product 834 having reduced polar properties relative to oxidizer electrolyte 816. Liquid product 834 migrates to the edges of oxidizer meniscus 820 and fills the annular wedge cavity formed by oxidizer meniscus 820 and separator aperture 822. With properly chosen dimensions of aperture 822,—for example, the diameter of aperture 822 and the depth of aperture 822 which is related to the thickness of separator 808—and shape of aperture 822, liquid product 834, which contains ionic species A⁻ 828 and B⁻ 830, contacts anode 804, thereby enabling electric current to flow. Limited solubility of $CO_2$ in liquid product 834 and oxidizer electrolyte 816 generates concentration gradients which force $CO_2$ gas out of the solution and into gas phase on fuel side 824 of separator 808. This process of forcing $CO_2$ into gas phase works even when the invention is practiced with alkaline oxidizer electrolyte and some, relatively low, concentration of $CO_3^{2-}$ is present in the electrolyte. Water produced in the oxidation process may in part be evaporated into gas phase and in part diffused into oxidizer electrolyte 816. The embodiment exemplified by fuel cell 800 is particularly suitable for operation with natural gas.

Figure 9:
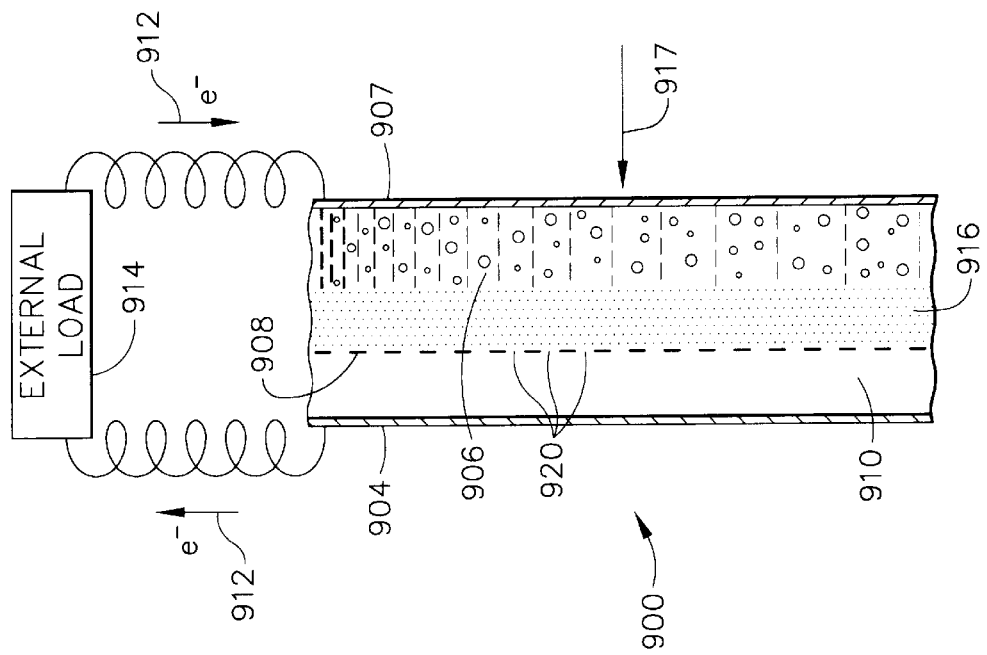
FIG. 9 is a schematic diagram, similar to that of FIG. 4, illustrating a general overview of a fuel cell according to an embodiment of the present invention.

Referring now to FIG. 9, there is shown yet another embodiment, exemplified by fuel cell 900, comprising anode 904, separator 908, fuel electrolyte 910, electrons 912, load 914, oxidizer electrolyte 916 and meniscus 920, which function as similarly numbered elements described above. When the present invention is practiced with alkaline oxidizer electrolyte 916, continuous operation of the cell depletes the OH⁻ oxidizer species and may dilute oxidizer electrolyte 916 with water. To sustain continuous operation, OH⁻ anions in the system should be continuously replenished and water removed from fuel cell 900. Fuel cell 900 includes a gas diffusion cathode 906. Gas diffusion cathode 906 includes cathode plate 907, which is permeable to oxygen 917. Gas diffusion cathode 906 is suitable for reduction of gaseous oxygen $O_2$ to OH⁻ oxidizer ions according to the reaction:

$$H_2O + \tfrac{1}{2}O_2 + 2e^- \rightarrow 2OH^- \tag{3}$$

Gas diffusion cathode 906 can also be adapted for production of $O_2H^-$ anions according to the reaction:

$$H_2O + O_2 + 2e^- \rightarrow O_2H^- + OH^- \tag{4}$$

An example of a cathode configuration which may be practiced with the present invention and is suitable for efficient production of alkaline hydrogen peroxide, is disclosed by Vetrovec in U.S. Patent entitled "Method of operating electrolytic cell to produce highly concentrated alkaline hydrogen peroxide", U.S. Pat. No. 6,004,449, issued on Dec. 21, 1999, and assigned to the assignee of the present invention. The disclosure in that patent is hereby incorporated by reference into the present application.

In fuel cell 900, the oxidation of fuel contained in fuel electrolyte 910 can occur in the interface region of meniscus 920 itself. Electrons 912 are collected by anode 904, which comprises an electrode structure immersed in fuel electrolyte 910. Electrons 912 are conducted around an external circuit including load 914 where useful electrical power may be produced. The returning electrons 912 are injected at immersed cathode 906 via cathode plate 907 into the polar oxidizer electrolyte 916 where they reduce the oxidizer in oxidizer electrolyte 916. The creation and separation of electrical charge is seen to be analogous to the generation of holes and electrons in the PN junction of a solar cell. The carbon dioxide evolved will dissolve in polar oxidizer electrolyte 916 and may be vented in an external loop (not shown in FIG. 9). When load 914 is removed from fuel cell 900, the electrode in the fuel, i.e. anode 904, will charge up with free electrons producing an electric field that can stop the reaction by preventing OH⁻ from diffusing into the interface region of meniscus 920. It is contemplated by the present disclosure that there are many variants on fuel and oxidizer which may be practical for operation of fuel cell 900 as described above.

FIG. 10 diagrammatically illustrates details of construction for an embodiment, exemplified by fuel cell 1000. Fuel cell 1000 comprises fuel chamber 1001, oxidizer chamber 1003, anode screen 1004, cathode screen 1006, liquid separator 1008, non-polar fuel 1010, polar oxidizer 1016 and meniscus 1020, which function as similarly numbered elements described above. Apertures 1022 may be provided with a hydrophobic coating.

FIG. 11 diagrammatically illustrates details of construction for another embodiment, exemplified by fuel cell 1100, depicted in FIG. 11 in a cut-away view. The structures in the liquid heterointerface fuel cell 1100 may be made flexible so that layers 1136 may be rolled up to increase the surface area and current available from a given volume. While fuel cells are intended to be operated with the fuel and oxidizer being continuously replaced, low cost versions of the disclosed cell could function as disposable primary batteries.

EXAMPLE 1

Oxidation of methanol by alkaline oxidizer electrolyte.

This process may be practiced in fuel cell 800 shown in FIG. 8, fed by methanol vapor.

Oxidation by OH⁻:

$$CH_3OH + 6OH^- \rightarrow CO_2 + 5H_2O + 6e^- \tag{5}$$

Oxidation by $O_2H^-$:

$$CH_3OH + 2O_2H^- \rightarrow CO_2 + 3H_2O + 2e^- \tag{6}$$

EXAMPLE 2

Oxidation of propane by alkaline oxidizer electrolyte.

This process may be practiced in the fuel cell shown in FIG. 8, fed by propane.

Oxidation by OH⁻:

$$C_3H_8 + 20OH^- \rightarrow CO_2 + 14H_2O + 20e^- \tag{7}$$

Oxidation by $O_2H^-$:

$$3C_3H_8 + 20O_2H^- \rightarrow 9CO_2 + 22H_2O + 20e^- \tag{8}$$

It should be understood, of course, that the foregoing relates to preferred embodiments of the invention and that modifications may be made without departing from the spirit and scope of the invention as set forth in the following claims.

We claim:

1. A fuel cell device for generation of electricity from a polar oxidizer liquid and a non-polar fuel fluid comprising:
   a separator for separating the polar oxidizer liquid from the nonpolar fuel fluid, comprising a material lyophobic with respect to the polar oxidizer liquid, said separator having a plurality of apertures, said apertures sized and spaced to provide a direct, controlled contact between the polar oxidizer liquid and the non-polar fuel fluid.

2. The fuel cell device of claim 1 wherein the polar oxidizer liquid is conductive and said direct, controlled contact between the polar oxidizer liquid and the non-polar fuel fluid forms a liquid heterointerface between said conductive polar oxidizer liquid and the non-polar fuel fluid.

3. The fuel cell device of claim 1 wherein the polar oxidizer liquid is conductive and said direct, controlled contact between the polar oxidizer liquid and the non-polar fuel fluid comprises a meniscus formed in each of said apertures, said meniscus providing a controlled contact surface between the non-polar fuel fluid and the polar oxidizer liquid, on which said controlled contact surface oxidation processes occur.

4. The fuel cell device of claim 1 wherein said apertures are between approximately 3 micrometers and 3 millimeters in diameter.

5. The fuel cell device of claim 1 wherein said apertures comprise at least 50% of a surface area of said separator.

6. The fuel cell device of claim 3 further comprising an anode, wherein said separator has an oxidizer side opposite from a fuel side and said fuel side of said separator is coated with a conductive material to form said anode, said conductive material in electric contact with a perimeter of said meniscus.

7. The fuel cell device of claim 1 further comprising an anode and a cathode, said anode and said cathode formed on opposite sides of said separator.

8. The fuel cell device of claim 1 for generation of electricity from a polar oxidizer liquid comprising an aqueous solution.

9. The fuel cell device of claim 1 for generation of electricity from a polar oxidizer liquid comprising aqueous solution of hydrogen peroxide.

10. The fuel cell device of claim 1 further comprising a solid catalyst applied to a wall of at least one of said apertures.

11. The fuel cell device of claim 1 further comprising a soluble catalyst.

12. The fuel cell device of claim 11 wherein said soluble catalyst is MTO catalyst.

13. The fuel cell device of claim 11 further comprising a co-catalyst.

14. The fuel cell device of claim 13 wherein said co-catalyst is bromine ions.

15. The fuel cell device of claim 1 further comprising a cathode configured so as to reduce oxygen to alkaline hydrogen peroxide.

16. The fuel cell device of claim 1 for generation of electricity from a non-polar fuel fluid comprising a hydrocarbon fuel gas.

17. A fuel cell device for generation of electricity from a conductive polar oxidizer liquid and a non-polar fuel fluid comprising:
    a cathode in contact with the polar oxidizer liquid;
    an anode in contact with the non-polar fuel fluid; and
    a separator for separating the polar oxidizer liquid from the non-polar fuel fluid, comprising a material lyophobic with respect to the polar oxidizer liquid, said separator having a plurality of apertures, said apertures sized and spaced to form a meniscus in each of said apertures, said meniscus providing a controlled contact surface and forming a liquid heterointerface between the conductive polar oxidizer liquid and the non-polar fuel fluid whereby oxidation processes occur in and about said liquid heterointerface.

18. The fuel cell device of claim 17 wherein said apertures are between approximately 3 micrometers and 3 millimeters in diameter.

19. The fuel cell device of claim 17 wherein said apertures comprise at least 50% of a surface area of said separator.

20. The fuel cell device of claim 17 wherein said separator has an oxidizer side opposite from a fuel side and said fuel side of said separator is coated with a conductive material to form said anode, said conductive material in electric contact with a perimeter of said meniscus.

21. The fuel cell device of claim 17 wherein said anode and said cathode are formed on opposite sides of said separator.

22. The fuel cell device of claim 17 for generation of electricity from a polar oxidizer liquid comprising an aqueous solution.

23. The fuel cell device of claim 17 for generation of electricity from a polar oxidizer liquid comprising peroxide.

24. The fuel cell device of claim 17 further comprising a solid catalyst applied to a wall of at least one of said apertures.

25. The fuel cell device of claim 17 further comprising a soluble catalyst.

26. The fuel cell device of claim 25 wherein said soluble catalyst is MTO catalyst.

27. The fuel cell device of claim 25 further comprising a co-catalyst.

28. The fuel cell device of claim 27 wherein said co-catalyst is bromine ions.

29. The fuel cell device of claim 17 further comprising a cathode configured so as to reduce oxygen to alkaline hydrogen peroxide.

30. The fuel cell device of claim 17 for generation of electricity from a non-polar fuel fluid comprising a hydrocarbon fuel gas.

31. A fuel cell device for generation of electricity from a conductive polar oxidizer liquid and a non-polar fuel fluid comprising:
    a cathode in contact with the polar oxidizer liquid;
    an anode in contact with the non-polar fuel fluid; and
    a separator for separating the polar oxidizer liquid from the non-polar fuel fluid, said separator comprising a material lyophobic with respect to the polar oxidizer liquid, said separator having a plurality of apertures, said apertures sized and spaced to form a meniscus in each of said apertures, said meniscus providing a controlled contact surface and forming a liquid heterointerface between the conductive polar oxidizer liquid and the non-polar fuel fluid, in and about which liquid heterointerface oxidation processes occur, said separator having an oxidizer side opposite from a fuel side, wherein said fuel side of said separator is coated with a conductive material to form said anode, said conductive material in electric contact with a perimeter of said meniscus, and said cathode is formed on said oxidizer side of said separator.

32. A method for generation of electricity from a conductive polar oxidizer liquid and a non-polar fuel fluid comprising the steps of:
    placing a cathode in contact with the polar oxidizer liquid;
    placing an anode in contact with the non-polar fuel fluid; and
    separating the polar oxidizer liquid from the non-polar fuel fluid, using a separator comprising a material lyophobic with respect to the polar oxidizer liquid, said separator having a plurality of apertures, said apertures sized and spaced to form a meniscus in each of said apertures, said meniscus forming a liquid heterointerface between the conductive polar oxidizer liquid and the non-polar fuel fluid whereby oxidation processes occur in and about said liquid heterointerface.

* * * * *